US008945773B2

(12) United States Patent
Harada et al.

(10) Patent No.: US 8,945,773 B2
(45) Date of Patent: Feb. 3, 2015

(54) NEGATIVE ELECTRODE ACTIVE MATERIAL FOR NONAQUEOUS ELECTROLYTE BATTERY, METHOD OF PRODUCING THE SAME, NONAQUEOUS ELECTROLYTE BATTERY AND BATTERY PACK

(75) Inventors: Yasuhiro Harada, Yokohama (JP); Norio Takami, Yokohama (JP); Hiroki Inagaki, Kawasaki (JP); Keigo Hoshina, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/238,415

(22) Filed: Sep. 21, 2011

(65) Prior Publication Data
US 2012/0070719 A1 Mar. 22, 2012

Related U.S. Application Data

(63) Continuation of application No. PCT/JP2010/053757, filed on Mar. 8, 2010.

(30) Foreign Application Priority Data

Mar. 25, 2009 (JP) ................................ 2009-073123

(51) Int. Cl.
*H01M 4/48* (2010.01)
*C01G 23/047* (2006.01)
(52) U.S. Cl.
CPC ............. *H01M 4/483* (2013.01); *C01G 23/047* (2013.01)
USPC ........................................ 429/231.5; 423/610
(58) Field of Classification Search
None
See application file for complete search history.

(56) References Cited

U.S. PATENT DOCUMENTS

| 6,489,062 B1* | 12/2002 | Watanabe et al. | 429/231.95 |
| 6,706,445 B2* | 3/2004 | Barker et al. | 429/231.1 |
| 2007/0292760 A1* | 12/2007 | Patoux et al. | 429/223 |
| 2009/0053605 A1 | 2/2009 | Harada et al. | |
| 2009/0061303 A1* | 3/2009 | Inagaki et al. | 429/163 |

(Continued)

FOREIGN PATENT DOCUMENTS

| JP | 2008-34368 | 2/2008 |
| JP | 2008-117625 | 5/2008 |

(Continued)

OTHER PUBLICATIONS

B. E. Warren, X-Ray Diffraction, Courier Dover Publications, 1990, p. 21.*

(Continued)

*Primary Examiner* — Barbara Gilliam
*Assistant Examiner* — Robert S Carrico
(74) *Attorney, Agent, or Firm* — Oblon, Spivak, McClelland, Maier & Neustadt, L.L.P.

(57) ABSTRACT

According to one embodiment, a negative electrode active material for nonaqueous electrolyte battery includes a titanium oxide compound having a crystal structure of monoclinic titanium dioxide. When a monoclinic titanium dioxide is used as the active material, the effective capacity is significantly lower than the theoretical capacity though the theoretical capacity was about 330 mAh/g. The invention comprises a titanium oxide compound which has a crystal structure of monoclinic titanium dioxide and a (001) plane spacing of 6.22 Å or more in the powder X-ray diffraction method using a Cu—Kα radiation source, thereby making an attempt to improve effective capacity.

13 Claims, 7 Drawing Sheets

(56) References Cited

U.S. PATENT DOCUMENTS

| | | | |
|---|---|---|---|
| 2011/0045328 A1 | 2/2011 | Inagaki et al. | |
| 2011/0052942 A1 | 3/2011 | Inagaki et al. | |
| 2011/0052994 A1 | 3/2011 | Harada et al. | |
| 2011/0073804 A1* | 3/2011 | Sotokawa et al. | 252/182.1 |

FOREIGN PATENT DOCUMENTS

| | | |
|---|---|---|
| JP | 2008-255000 | 10/2008 |
| WO | 2009/028530 A1 | 3/2009 |
| WO | WO 2009/028530 | 3/2009 |
| WO | WO 2009/028553 | 3/2009 |

OTHER PUBLICATIONS

JP 2008-117625 A JPO Machine Translation, Retrieved Feb. 18, 2012.*

U.S. Appl. No. 13/053,913, filed Mar. 22, 2011, Inagaki, et al.

International Search Report issued Apr. 27, 2010 in PCT/JP2010/053757 filed Mar. 8, 2010.

A. Robert Armstrong et al.; "Lithium-Ion Intercalculation into $TiO_2$-B Nanowires"; Advanced Materials, 2005, vol. 17, No. 7, pp. 862-865.

Rene Marchand et al.; "$TiO_2$(B) A New Form of Titanium Dioxide and the Potassium Octatitanate $K_2Ti_8O_{17}$"; Material Research Bulletin, 1980, vol. 15, pp. 1129-1133.

Japanese Office Action dated Jun. 26, 2012 in Japanese Application No. 2011-505950. (w/English Translation).

Murota, Y., et al., (2008), Synthesis of High Potential Negative Electrode TiO2 (8) and Its Electrochemical Evaluation (2), Summary of the 49th Battery Symposium, 331p.

Office Action in corresponding Chinese application No. 201080006244.0, mailed Mar. 17, 2014 (w/English translation).

A. Armstrong, et al., "$TiO_2$-B Nanowires", Angew. Chem. Inst. Ed., 2004, vol. 43, No. 17, pp. 2286-2288.

J. Banfield, et al., "The Identification of Naturally Occurring $TiO_2$ (B) by Structure Determination Using High-Resolution Electron Microscopy, Image Simulation, and Distance-Least-Squares Refinement", American Mineralogist, 1991, vol. 76, pp. 343-353.

Japanese Office Action dated Aug. 5, 2014 (w/English Translation).

Japanese Office Action dated Dec. 9, 2014 in Application No. 2011-505950 (with English translation).

* cited by examiner

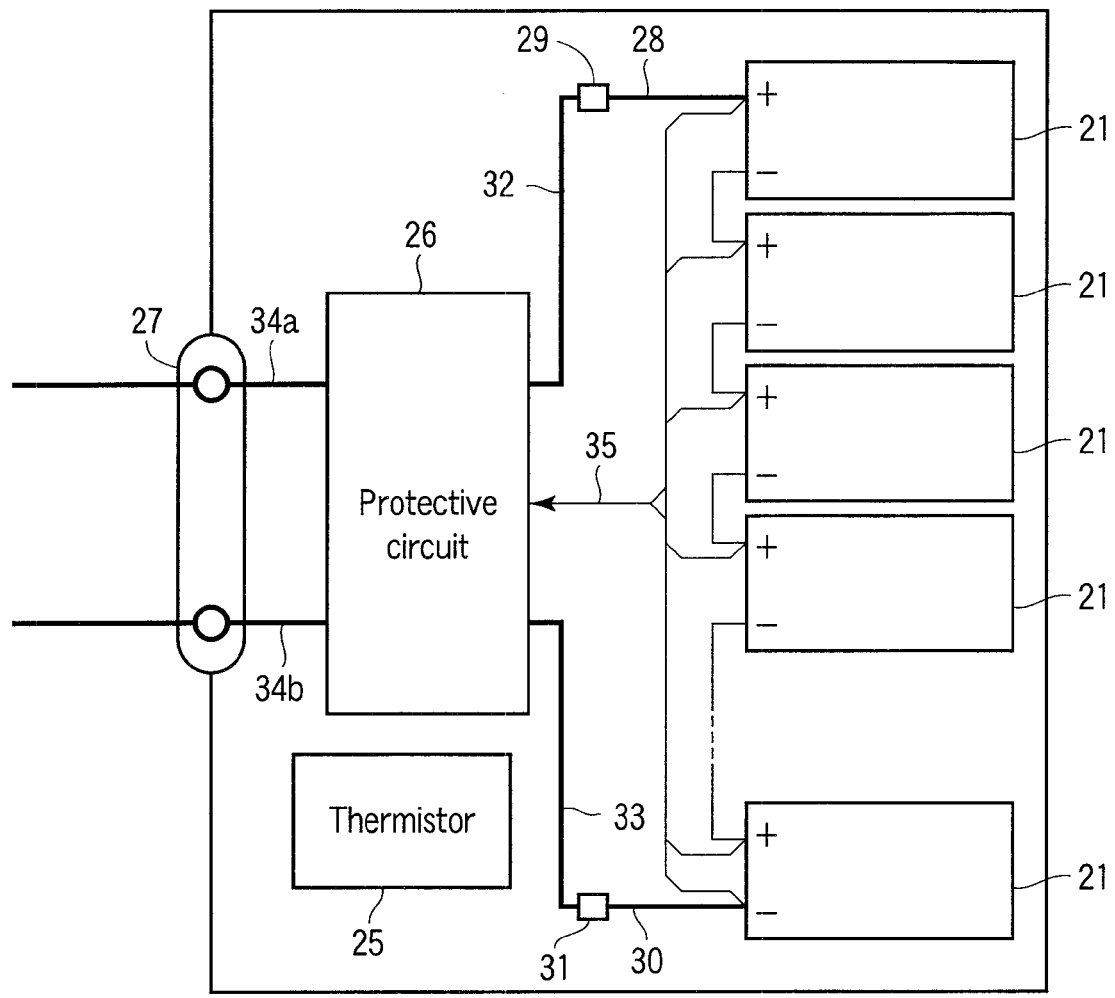
F I G. 7

NEGATIVE ELECTRODE ACTIVE MATERIAL FOR NONAQUEOUS ELECTROLYTE BATTERY, METHOD OF PRODUCING THE SAME, NONAQUEOUS ELECTROLYTE BATTERY AND BATTERY PACK

CROSS-REFERENCE TO RELATED APPLICATIONS

This application is based upon and claims the benefit of priority from prior Japanese Patent Application No. 2009-073123, filed Mar. 25, 2009, the entire contents of which are incorporated herein by reference.

FIELD

Embodiments described herein relate generally to a negative electrode active material for nonaqueous electrolyte battery, a method of producing the negative electrode active material, a nonaqueous electrolyte battery and a battery pack.

BACKGROUND

Since the nonaqueous electrolyte battery such as lithium ion secondary battery have high energy densities, they are expected to be used for power sources for hybrid vehicles, electric cars, and an uninterruptible power supply for base stations for portable telephone, and the like. Therefore, the nonaqueous electrolyte battery is desired to have other performances such as rapid charge/discharge performances and long-term reliability. For example, a nonaqueous electrolyte battery enabling rapid charge/discharge not only remarkably shortens the charging time but also makes it possible to improve performances of the motive force of a hybrid vehicle and the like and to efficiently recover the regenerative energy of them.

In order to enable rapid charge/discharge, it is necessary that electrons and lithium ions can migrate rapidly between the positive electrode and the negative electrode. When a battery using a carbon based material in the negative electrode repeats rapid charge/discharge, this causes dendrite precipitation of metal lithium on the electrode, raising the fear as to heat generation and fires caused by internal short circuits.

In light of this, a battery using a metal composite oxide in place of a carbonaceous material in the negative electrode has been developed. Particularly, a battery using a titanium oxide as the negative electrode active material enables stable rapid charge/discharge and also has a longer life than those using a carbonaceous material.

However, titanium oxide has a higher potential than carbonaceous material relative to metal lithium. Further, titanium oxide has a lower capacity per mass. Thus a battery using titanium oxide as the negative electrode active material has a problem that the energy density is lower.

For example, the potential of the electrode using titanium oxide is about 1.5 V based on metal lithium and is nobler than that of the electrode using carbonaceous material. The potential of titanium oxide is due to the redox reaction between $Ti^{3+}$ and $Ti^{4+}$ when lithium is electrochemically inserted and released and is therefore limited electrochemically. Further, there is the fact that the inserted and released of lithium ions by rapid charge/discharge is possible at an electrode potential as high as about 1.5 V. It is therefore substantially difficult to drop the potential of the electrode to improve energy density.

As to the capacity of the battery per unit mass, the theoretical capacity of titanium dioxide having an anatase structure is about 165 mAh/g and the theoretical capacity of a lithium-titanium composite oxide such as $Li_4Ti_5O_{12}$ is also about 170 mAh/g. On the other hand, the theoretical capacity of a general graphite type electrode material is 385 mAh/g or more. Therefore, the capacity density of titanium oxide is significantly lower than that of the carbon type material. This is due to a reduction in substantial capacity because there are only a small number of equivalent lithium-absorbing sites in the crystal structure and lithium tends to be stabilized in the structure.

In light of this, monoclinic titanium dioxide has recently attracted attention (see R. Marchand, L. Brohan, M. Tournoux, Material Research Bulletin 15, 1129 (1980)). Lithium titanate having a spinel structure such as $Li_4Ti_5O_{12}$ can release/insert 3 lithium ions per unit chemical formula. Therefore, the number of lithium ions per titanium ion is 3/5 and a theoretical maximum of 0.6. On the other hand, in monoclinic titanium dioxide, the number of lithium ions per titanium ion which can be released/inserted is a maximum of 1.0. Accordingly, the theoretical capacity of monoclinic titanium dioxide is about 330 mAh/g. Therefore, it is expected that monoclinic titanium dioxide may be used as a high-capacity negative electrode active material.

For example, JP-A 2008-34368 (KOKAI) discloses a lithium ion storage battery using titanium oxide $TiO_2$ having a bronze structure as the negative electrode active material. JP-A 2008-34368 (KOKAI) discloses that the substantial capacity of a lithium ion storage battery using the titanium oxide $TiO_2$ as the electrode active material and a lithium metal as the counter electrode is about 200 mAh/g (for example, Paragraph 0029 and FIG. 4).

JP-A 2008-117625 (KOKAI) discloses a lithium secondary battery using, as the active material, titanium dioxide having crystal structure of a bronze type titanic acid. JP-A 2008-117625 (KOKAI) discloses that a lithium secondary battery (coin type cell) using the titanium dioxide as the active material and a lithium metal as the counter electrode has an initial insertion and release capacity of 160 to 170 mAh/g based on the mass of the active material (for example, Paragraphs 0053 and 0057).

Although, the theoretical capacity in the case of using monoclinic titanium dioxide as the active material is about 330 mAh/g, the substantial capacities disclosed in JP-A 2008-34368 (KOKAI) and JP-A 2008-117625 (KOKAI) are significantly lower than the theoretical capacity. Therefore, if the titanium dioxide described in JP-A 2008-34368 (KOKAI) or JP-A 2008-117625 (KOKAI) are used as the active material, it is difficult to raise the capacity further as compared, for example, with the case of using lithium titanate having a spinel structure which has the theoretical capacity of 170 mAh/g.

BRIEF DESCRIPTION OF THE DRAWINGS

FIG. 7 is a block diagram showing an electric circuit of a battery pack shown in FIG. 6;

DETAILED DESCRIPTION

Figure 1:
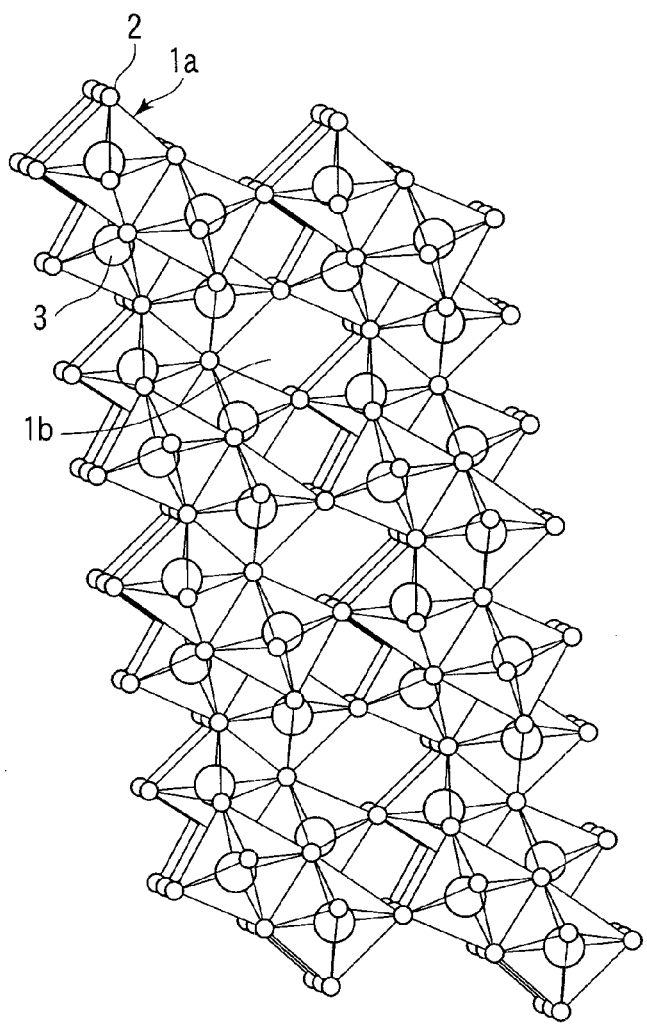
FIG. 1 is a typical view of a crystal structure of $TiO_2(B)$ in a first embodiment.

In general, according to one embodiment, a negative electrode active material for nonaqueous electrolyte battery is provided. The active material includes a titanium oxide compound having a crystal structure of a monoclinic titanium dioxide and satisfying the following equation (I):

$$d_{001} \geq 6.22 \text{ Å} \quad (I)$$

wherein $d_{001}$ is the spacing of the (001) plane which is measured by the powder X-ray diffraction method using a Cu-Kα radiation source.

In general, according to another embodiment, a method of producing a negative electrode active material for nonaqueous electrolyte battery is provided. The method includes: reacting an acid with at least one compound selected from the group consisting of potassium titanate, sodium titanate and cesium titanate to exchange alkali cations thereof for protons, thereby obtaining a proton-exchanged compound; and heat-treating the proton-exchanged compound to synthesize a titanium oxide compound which has a crystal structure of a monoclinic titanium dioxide. The titanium oxide compound produced by the method is satisfied the following equation (I) and (II):

$$d_{001} \geq 6.22 \text{ Å} \quad (I)$$

$$I(200)/I(001) \leq 0.5 \quad (II)$$

wherein $d_{001}$ is the spacing of the (001) plane; I(001) is the peak intensity of the (001) plane; and I(200) is the peak intensity of the (200) plane; which are measured by the powder X-ray diffraction method using a Cu-Kα radiation source.

In general, according to another embodiment, a nonaqueous electrolyte battery is provided. The battery includes a positive electrode; a negative electrode comprising the negative electrode active material according to above embodiment; and a nonaqueous electrolyte.

In general, according to another embodiment, a battery pack comprising the nonaqueous electrolyte battery is provided.

(First Embodiment)

A negative electrode active material for nonaqueous electrolyte battery according to a first embodiment comprises a titanium oxide compound having a crystal structure of a monoclinic titanium dioxide and satisfying the following equation (I):

$$d_{001} \propto 6.22 \text{ Å} \quad (I)$$

wherein $d_{001}$ is the spacing of the (001) plane which is measured by the powder X-ray diffraction method using a Cu-Kα radiation source.

The problem that monoclinic titanium dioxide has an effective capacity less than the theoretical capacity is considered to be caused by smaller effective mobile Li ions because the diffusibility of Li ions in a solid is low though there are many sites having the possibility of becoming Li hosts in the crystal structure. The symmetric properties such as a space group in monoclinic titanium dioxide may be varied because strains are generated depending on the amount and type of intercalation. The inventors first found that the diffusibility of Li ions in a solid is improved to thereby improve the effective capacity while maintaining an electrode potential close to 1.5 V based on lithium by using a negative electrode active material comprising a titanium oxide compound according to the embodiment. As a result, a nonaqueous electrolyte battery can be attained which has a high energy density and excellent repeat charge/discharge performances.

Here, the crystal structure of monoclinic titanium dioxide is designated as $TiO_2(B)$. The crystal structure represented by $TiO_2(B)$ primarily belongs to the space group C2/m and has a tunnel structure as shown in FIG. 1. The details of the crystal structure of $TiO_2(B)$ are described in R. Marchand, L. Brohan, M. Tournoux, Material Research Bulletin 15, 1129 (1980).

The crystal structure represented by $TiO_2(B)$ has a structure in which, as shown in FIG. 1, a titanium ion 3 and an oxide ion 2 constitute a skeleton structure part 1a and skeleton structure parts 1a are alternately arranged. A void 1b is formed between the skeleton structure parts 1a. This void 1b may be a host site for the intercalation (or insertion) of different atom species. In $TiO_2(B)$, it is said that host sites which can absorb and release different atom species exist on the surface of the crystal. Lithium ions are inserted into and released from these host sites, whereby $TiO_2(B)$ can reversibly absorb and release lithium ions.

When lithium ions are inserted into the voids 1b, $Ti^{4+}$ constituting the skeleton is reduced to $Ti^{3+}$ to thereby keep the electrical neutrality of the crystal. Because $TiO_2(B)$ has one $Ti^{4+}$ per chemical formula, a maximum of one lithium ion can be theoretically inserted per chemical formula. Therefore, a titanium oxide compound having a $TiO_2(B)$ crystal structure may be represented by the formula $Li_xTiO_2$ ($0 \leq x \leq 1$). In this case, this titanium oxide compound provides a theoretical capacity of 335 mAh/g, which is about two times that of titanium dioxide described in JP-A 2008-34368 (KOKAI) and JP-A 2008-117625 (KOKAI).

The inventors have found that the mobility of Li ions in a solid is improved by increasing the size of the above void 1b in the titanium oxide compound having a $TiO_2(B)$ crystal structure and as a result, the effective capacity of the electrode and repeat charge/discharge performances can be improved.

The size of the void 1b can be adjusted by controlling $d_{001}$ of the crystal lattice. $d_{001}$ can be calculated from a (001) plane peak which appears in the vicinity of $2\theta = 14.5°$ in the pattern obtained by the powder X-ray diffraction method using a Cu-Kα radiation source. Here, the term "in the vicinity of $2\theta = 14°$" is intended to mean a range of $2\theta = 14° \pm 2°$, namely $2\theta$ is from 12° to 16°.

The titanium oxide compound according to this embodiment has $d_{001}$ of 6.22 Å or more. When $d_{001}$ is 6.22 Å or more, a high effective capacity and excellent repeat charge/discharge performances can be provided. When $d_{001}$ is less than 6.22 Å, the mobility of Li ions inserted into the lattice crystal is significantly reduced, leading to reduction in charge/discharge efficiency and effective capacity.

Further, $d_{001}$ is preferably 6.50 Å or less. When $d_{001}$ is 6.50 Å or less, the crystal structure is stable and good repeat charge/discharge performances are obtained.

Moreover, the titanium oxide compound according to this embodiment preferably has a peak intensity ratio defined by the following equation (II).

$$I(200)/I(001) \leq 0.5 \quad (II)$$

where I(001) is the peak intensity of the (001) plane and I(200) is the peak intensity of the (200) plane which appears in the vicinity of 2θ=15° in the pattern obtained by the powder X-ray diffraction method using a Cu-Kα radiation source. The peak of the (200) plane lie adjacent to the peak of the (001) plane in the X-ray diffraction pattern. Here, the term "in the vicinity of 2θ=15°" is intended to mean a range of 2θ=15°±2°, namely 2θ is from 13° to 17°.

The peak intensity ratio I(200)/I(001) is preferably 0.5 or less. When the peak intensity ratio I(200)/I(001) is 0.5 or less, a proper amount of water is kept in the crystal structure, so that the volume of lithium ion host sites is sufficiently secured. At this time, the projected area of the void $1b$ can reach the maximum value. This enables more smooth migration of lithium ions, leading to more improvements in effective capacity and repeat charge/discharge performances. Further, because the generation of different crystal phases is limited, an improvement in charge/discharge efficiency can be expected.

Here, the method of powder X-ray diffraction measurement will be explained.

First, an target sample is ground until the average particle diameter reaches about 5 μm. The ground sample is filled in a holder part which is formed on a glass sample plate and has a depth of 0.2 mm. At this time, much care is necessary to fill the holder part fully with the sample. Further, special care should be taken to avoid cracking and formation of voids caused by insufficient filling of the sample.

Then, a separate glass plate is used to smooth the surface of the sample by sufficiently pressing the separate glass plate against the sample. Much care should be taken to avoid too mach or too little amount of the sample to be filled, thereby preventing any rises and dents in the basic plane of the glass holder. The glass plate filled with the sample is mounted on the powder X-ray diffractometer.

Then, the measurement is carried out by using Cu-Kα rays to determine the position and the intensity of the peak of the (001) plane which appears in the vicinity of 2θ=14°. $d_{001}$ can be calculated from the obtained position of the peak. Generally, the plane spacing can be calculated by the following Bragg reflection condition equation:

$$2d\sin\theta = n\lambda$$

wherein d: plane spacing, λ: wavelength of X-ray to be used, n: integer and θ=angle of a peak position.

When the sample has a high orientation, there is the possibility of a shift of a peak position and variation in intensity ratio, depending on how the sample is filled. Such a sample is made into a pellet form for measurement. The pellet may be a compressed powder body 10 mm in diameter and 2 mm in thickness, which is manufactured by applying a pressure of about 250 MPa to the sample for 15 minutes. The obtained pellet is set to an X-ray diffractometer to measure the surface. The measurement using such a method eliminates a difference in the results of the measurement between operators, enabling high reproducibility.

Further, the intensity of the peak of the (200) plane which appears in the vicinity of 2θ=15° in the pattern obtained by the powder X-ray diffraction is determined. The intensity of the peak of the (200) plane is used to calculate the intensity ratio I(200)/I(001). When these two peaks (i.e. diffraction curves) are separated, the ratio is calculated from intensity of each peak.

In the case where the peak of the (001) plane and the peak of the (200) plane cannot be easily separated from each other, the obtained data may be treated by a computer using specified software to obtain each peak intensity. When these two peaks cannot be separated even by such techniques, the intensity ratio I(200)/I(001) is regarded as 0 in this embodiment.

There is the case where the peak intensities of the (001) plane and (200) plane cannot be detected. This is considered to be due to the influence of, for example, orientation during the growth of crystals. When the peak of the (001) plane is not detected, the plane spacing of the (001) plane is for example, calculated using the index of other plane which may be used for estimation the plane spacing of the (001) plane by geometrical computation. In the simplest example, the plane spacing of the (002) plane is used for estimation. In this case, d(001)=d(002)×2. In the case where the peak of the (200) plane is not detected, it may also be likewise calculated from the index of other plane.

<Particle Diameter and BET Specific Surface Area>

The active material of the electrode is said to enable more rapid charge/discharge and has higher capacity with increase in the contact surface with the electrolytic solution and also with increase in the number of host sites. For this, there is an attempt to improve the rapid charge/discharge performance by grinding titanium oxide.

The average particle diameter of the titanium oxide compound in this embodiment may be varied corresponding to desired battery performances without any particular limitation. The BET specific surface area of the titanium oxide compound in this embodiment is preferably 6 to 200 $m^2/g$ though no particular limitation is imposed.

If the specific surface area is 6 $m^2/g$ or more, the contact area with the electrolytic solution can be secured. If the specific surface area is 200 $m^2/g$ or less, on the other hand, the reactivity with the electrolytic solution is not too high and therefore, the life performances can be improved. Further, this limited specific surface area allows a slurry containing the active material to be coated with facility in the production of an electrode, which will be described later.

Here, in the measurement of the specific surface area, a method comprising the following step is used:

a molecule of which the adsorption occupying area is known is made to adsorb to the surface of the powder particle at the temperature of liquid nitrogen; and the specific surface area of the powder particle is calculated from the amount of the molecule adsorbed on it. A method that is most frequently used to obtain the specific surface area is the BET method. The BET method uses the low-temperature and low-humidity physical adsorption of an inert gas and is based on the well-known theory for the calculating specific surface area. The theory is obtained by extending the Langmuir theory which is monolayer adsorption theory to multilayer adsorption. The specific surface area calculated in this manner is referred to as the "BET specific surface area".

(Second Embodiment)

A method of producing a negative electrode active material for nonaqueous electrolyte battery according to the above first embodiment will be explained in detail.

A titanium oxide compound according to the first embodiment is obtained by sintering of a proton-exchanged compound, which is a starting material. The inventors have succeeded in obtaining a titanium oxide compound which has a $TiO_2(B)$ structure and a plane spacing $d_{001}$ of 6.22 Å or more by properly adjusting the sintering condition.

As the starting material, alkali titanate compounds such as $Na_2Ti_3O_7$, $K_2Ti_4O_9$ and $Cs_2Ti_5O_{12}$ may be used, though the embodiment is not limited by these compounds.

The alkali titanate compound which may be the starting material is prepared by a usual solid phase reaction method. For example, the alkali titanate compound may be synthesized by blending a raw material such as oxide, carbonate and the like in a proper stoichiometric ratio and by heating the mixture. Alternatively, a reagent of a commercially available alkali titanate compound may be used.

First, a powder of an alkali titanate compound is washed with distilled water to remove impurities. Then, 0.5 to 2 M of an acid such as hydrochloric acid, nitric acid or sulfuric acid is added to the alkali titanate compound powder, followed by stirring. Alkali cations of the alkali titanate compound are exchanged for protons by this acid treatment to thereby obtain a proton-exchanged compound. The acid treatment is preferably carried out until protons are sufficiently exchanged.

The time required for the acid treatment is preferably 24 hours or more and more preferably 1 to 2 weeks when the acid treatment is carried out at ambient temperature (about 25° C.) by using about 1 M of hydrochloric acid. The acid solution is preferably exchanged for a new one, for example, every 24 hours to ensure the progress of proton exchange.

After the proton exchange is finished, an alkaline solution such as an aqueous lithium hydroxide solution may be added to neutralize residual acids. After the proton exchange is completed, the reaction product is washed with distilled water. Although no particular limitation is imposed on the degree of washing, the reaction product is washed until the pH of washed water falls in a range from 6 to 8. Then, the product is dried to obtain an intermediate product, a proton-exchanged compound. Here, the process of neutralization washing of residual acid and the drying process may be omitted and the obtained proton-exchanged compound may be subjected to a heat treating step.

Such an ion exchange method enables alkali cations to be exchanged for protons without destroying the crystal structure of the alkali titanate compound.

Preferably, the raw material compound is ground by a ball mill before the ion exchange method so that proton exchange is smoothly accomplished. As to grinding conditions for a container having an area of 100 cm$^2$, zirconia balls having a diameter of about 10 to 15 mm are used and the ball mill is rotated at 600 to 1000 rpm for about 1 to 3 hours. When the rotating time is less than one hour, this is undesirable because the raw material is ground only insufficiently. Further, if the raw material is ground for a time as long as 3 hours or more, it is phase-separated into a compound different from a target product because a mechanochemical reaction proceeds, which is undesirable.

Next, the obtained proton-exchanged compound is heat-treated to obtain a titanium oxide compound as a target product. The heating condition is properly selected such that $d_{001}$ of the TiO$_2$(B) crystal is 6.22 Å or more. The inventors have found that optimum heating conditions differ depending on the composition of the starting material, particle diameter, crystal form and proton exchange condition. It is therefore necessary to properly determine the optimum heating condition in accordance with the starting material. Even if any starting material is used, a titanium oxide compound having a plane spacing of (001) plane $d_{001}$ of 6.22 Å or more can be obtained by controlling, for example, the heating temperature and time.

In the method according to this embodiment, an electric furnace is heated in advance to perform a precise heat treatment. The sample is introduced into the electric furnace after the electric furnace reaches a set temperature. After the sample is heated under heating conditions which is determined specifically for the sample, it is taken out of the furnace rapidly, followed by rapid cooling in air. This enables the heating condition to be set exactly and therefore, restrains the produced TiO$_2$(B) crystal from being excessively dehydrated.

The heating temperature is preferably in a range from 300° C. to 500° C., more preferably in a range from 350° C. to 400° C., because the crystal plane spacing is easily controlled. When the heating temperature is 300° C. or more, this is preferable because a dehydration reaction rapidly proceeds, which improves crystallinity, bringing about improvements in electrode capacity, charge/discharge efficiency and repeat performances of the battery. When the heating temperature is 500° C. or less, this is preferable because the progress of a dehydration reaction is not too fast and therefore, the (001) plane of the TiO$_2$(B) crystal structure is not decreased too much. Further, when the heating temperature is 500° C. or less, this restrains the generation of titanium dioxide having anatase structure which is an impurity phase and deteriorates the electrode performance.

The appropriate heating temperature and heating time can be determined by the following procedures. The proton-exchanged compound is heated at each of five different temperatures set at intervals of 25° C. in a temperature range from 300° C. to 400° C. for 3 hours. With regard to the obtained titanium oxide compound, the peak intensity of the (001) plane which appears in the vicinity of 2θ=14° is measured. Then, using the peak intensity, calculate $d_{001}$ value. The optimum heating temperature is determined from this $d_{001}$ value.

The titanium oxide compound which has been heat-treated under an appropriate heating condition according to the embodiment has a (001) plane spacing $d_{001}$ of 6.22 Å or more. Such a titanium oxide makes it possible to attain a charge/discharge capacity of 220 mAh/g, which is higher by 10 to 30% than that of titanium dioxide, which has a TiO$_2$(B) structure and is produced by a conventionally known method.

Before this application, it was not known that heating conditions affect lattice plane spacing, as well as the lattice plane spacing affects the electrode performance. In conventional methods of synthesizing titanium dioxide having a TiO$_2$(B) structure, it is considered that the heating conditions for a proton-exchanged compound are determined to sufficiently improve the crystallinity of TiO$_2$(B). However, if the crystallinity of TiO$_2$(B) becomes too high, the dehydration reaction of the crystal lattice is caused excessively, resulting in a narrower lattice plane spacing. Particularly, the plane spacing $d_{001}$ calculated from a diffraction curve corresponding to the (001) plane is less than 6.22 Å (see R. Marchand, L. Brohan, M. Tournoux, Material Research Bulletin 15, 1129 (1980)).

For example, the heating conditions described in JP-A 2008-34368 (KOKAI) are 400° C. and 3 hours. The Li-release capacity of titanium dioxide described in JP-A 2008-34368 (KOKAI) is 200 mAh/g or less, which is lower than that of the titanium oxide compound of this embodiment. Further, in JP-A 2008-117625 (KOKAI), the heating temperature is 320° C., which is a relatively low temperature, whereas the heating time is 20 hours. The initial Li-release capacity of titanium dioxide in this JP-A 2008-117625 (KOKAI) is about 160 mAh/g, which is significantly lower.

As mentioned above, titanium dioxide synthesized by a conventional method is deteriorated in electrode performance. It is understood from the viewpoint of electrode performance that in these conventional methods, the proton-exchanged compound is excessively heated.

Therefore, a titanium oxide compound which is superior in electrode performance and has a TiO$_2$(B) structure in which the plane spacing $d_{001}$ is 6.22 Å or more, can be obtained by appropriately selecting the heating conditions of the proton-exchanged compound according to the embodiment.

(Third Embodiment)

In the Third embodiment, a nonaqueous electrolyte battery is provided. The nonaqueous electrolyte battery comprises a positive electrode, a negative electrode, a nonaqueous electrolyte, a separator and a container. In this embodiment, the negative electrode comprises a negative electrode active material according to the first embodiment.

Hereinafter, the positive electrode, negative electrode, nonaqueous electrolyte, separator, and container will be explained in detail.

1) Positive Electrode

The positive electrode comprises a current collector and a positive electrode layer (namely, positive electrode active material-containing layer). The positive electrode layer is formed on one or both surfaces of the current collector and contains a positive electrode active material, and optionally, a conductive agent and a binder.

Examples of the positive electrode active material include oxides and sulfides. Specific examples of the positive electrode active material include manganese dioxide ($MnO_2$), iron oxide, copper oxide, and nickel oxide impregnated with lithium, lithium-manganese composite oxide (such as $Li_xMn_2O_4$ or $Li_xMnO_2$), lithium-nickel composite oxide (such as $Li_xNiO_2$), lithium-cobalt composite oxide (such as $Li_xCoO_2$), lithium-nickel-cobalt composite oxide (such as $LiNi_{1-y}Co_yO_2$), lithium-manganese-cobalt composite oxide (such as $Li_xMn_yCo_{1-y}O_2$), lithium-manganese-nickel composite oxide having a spinel structure ($Li_xMn_{2-y}Ni_yO_4$), lithium-phosphorous oxide having an olivine structure (such as $Li_xFePO_4$, $Li_xFe_{1-y}Mn_yPO_4$ and $Li_xCoPO_4$), iron sulfate [$Fe_2(SO_4)_3$], vanadium oxide (such as $V_2O_5$) and lithium-nickel-cobalt-manganese composite oxide. Here, x and y satisfy the following equations: $0 \leq x \leq 1$ and $0 \leq y \leq 1$.

Preferable examples of the positive electrode active material include lithium-manganese composite oxide ($Li_xMn_2O_4$), lithium-nickel composite oxide ($Li_xNiO_2$), lithium-cobalt composite oxide ($Li_xCoO_2$), lithium-nickel-cobalt composite oxide ($LiNi_{1-y}Co_yO_2$), lithium-manganese-nickel composite oxide having a spinel structure ($Li_xMn_{2-y}Ni_yO_4$), lithium-manganese-cobalt composite oxide ($Li_xMn_yCo_{1-y}O_2$), Lithium-iron phosphate ($Li_xFePO_4$) and lithium-nickel-cobalt-manganese composite oxide. These active materials make it possible to obtain a high positive electrode voltage. Here, x and y satisfy the following equations: $0 \leq x \leq 1$ and $0 \leq y \leq 1$.

When a nonaqueous electrolyte uses a cold molten salt, lithium-iron phosphate, $Li_xVPO_4F$, lithium-manganese composite oxide, lithium-nickel composite oxide and lithium-nickel-cobalt composite oxide are preferably used from the viewpoint of cycle life. This is because the use of these oxides brings about less reactivity between the positive electrode active material and the cold molten salt.

The primary particle diameter of the positive electrode active material is preferably 100 nm to 1 μm. A positive electrode active material having a primary particle diameter of 100 nm or more is easily handled in industrial production. A positive electrode active material having a primary particle diameter of 1 μm or less enables lithium ions to diffuse smoothly in solid.

The specific surface area of the positive electrode active material is preferably 0.1 $m^2$/g to 10 $m^2$/g. A positive electrode active material having a specific surface area of 0.1 $m^2$/g or more can secure lithium ion-absorption and release sites sufficiently. A positive electrode active material having a specific surface area of 10 $m^2$/g or less is easily handled in industrial production and ensures a good charge-discharge cycle performance.

Examples of the binder for binding the positive electrode active material with the current collector include polytetrafluoroethylene (PTFE), polyvinylidene fluoride (PVdF) and fluoro-rubber.

The conductive agent is formulated as required to improve the current collecting ability and to reduce the contact resistance with the current collector. Examples of the conductive agent include carbonaceous materials such as acetylene black, carbon black and graphite.

The ratios of the positive electrode active material and binder are preferably 80% by mass to 98% by mass and 2% by mass to 20% by mass respectively. When the amount of the binder is 2% by mass or more, satisfactory electrode strength is obtained. Further, when the amount of the binder is 20% by mass or less, the amount of the insulating material of the electrode can be reduced, leading to reduced internal resistance.

When the conductive agent is added, its amount is designed to be 3% by mass or more to obtain the effect of its addition. When its amount is designed to be 15% by mass or less, on the other hand, the decomposition of the nonaqueous electrolyte on the surface of the conductive agent can be reduced even when the battery is stored at high temperatures.

The positive electrode can be manufactured by, for example, suspending the positive electrode active material and binder and the conductive agent if necessary, in an appropriate solvent to prepare a slurry, by applying this slurry to the surface of the current collector and drying to form a positive electrode layer, which is then pressed.

Alternatively, the positive electrode can be manufactured by mixing the positive electrode active material and binder, and the conductive agent if necessary, forming the mixture into a pellet. The pellet can be used as the positive electrode layer.

The current collector is preferably an aluminum foil or an aluminum alloy foil.

The thickness of the aluminum foil or aluminum alloy foil is preferably 5 μm to 20 μm and more preferably 15 μm or less. The purity of the aluminum foil is preferably 99% by mass or more. The aluminum alloy is preferably an alloy containing elements such as magnesium, zinc and silicon. The content of transition metals such as iron, copper, nickel and chromium contained in the aluminum foil or aluminum alloy foil is preferably designed to be 1% by mass or less.

2) Negative Electrode

The negative electrode comprises a current collector and a negative electrode layer (namely, negative electrode active material-containing layer). The negative electrode layer is formed on one or both surfaces of the current collector and contains a negative electrode active material, a conductive agent and a binder. In the negative electrode layer, the binder is filled in clearances between the dispersed negative electrode active materials. A conductive agent is formulated in the negative electrode layer to improve the current collecting performance and to restrain the contact resistance with the current collector.

The negative electrode active material comprises the titanium oxide compound according to the first embodiment. The titanium oxide compound has a crystal structure of a monoclinic titanium dioxide and satisfies the following equation (I):

$$d_{001} \geq 6.22 \text{ Å} (0.622 \text{ nm}) \tag{I}$$

wherein $d_{001}$ is the spacing of the (001) plane which is measured by the powder X-ray diffraction method using a Cu-Kα radiation source. This titanium oxide compound preferably has a peak intensity ratio I(200)/I(001) of 0.5 or less.

The above titanium oxide compound according to the first embodiment may be used solely as the negative electrode active material. Alternatively, it may be used together with other compound as the negative electrode active material. The examples of the other compound which may be used as the negative electrode active material include titanium dioxide having an anatase structure $TiO_2$, lithium titanate having a rhamsdelite structure $Li_2Ti_3O_7$ and lithium titanate having a spinel structure $Li_4Ti_5O_{12}$. These compounds are preferable because they have a specific gravity close to titanium oxide compound according to the first embodiment and are easily mixed and dispersed.

Examples of the conductive agent include carbonaceous materials such as acetylene black, carbon black and graphite.

Examples of the binder include a polytetrafluoroethylene (PTFE), polyvinylidene fluoride (PVdF), fluoro-rubber and styrene-butadiene rubber.

The binder is preferably formulated in an amount range from 2% by mass to 30% by mass in the negative electrode layer. When the amount of the binder is 2% by mass or more, the binding force between the negative electrode layer and the current collector is satisfactory and excellent cycle performances can be expected. On the other hand, the amount of the binder is preferably 30% by mass or less from the viewpoint of high capacity. The conductive agent is also preferably formulated in an amount of 30% by mass or less in the negative electrode layer.

For the current collector, materials which are electrochemically stable at the lithium absorption and release potential of the negative electrode active material are used. The current collector is preferably made of copper, nickel, stainless or aluminum. The thickness of the current collector is preferably 5 to 20 μm. A current collector having such a thickness can keep the balance between the strength of the negative electrode and light-weight performances.

The negative electrode can be manufactured by, for example, suspending the negative electrode active material, binder and conductive agent in a usual solvent to prepare a slurry, by applying this slurry to the surface of the current collector and by drying to form a negative electrode layer, which is then pressed.

Alternatively, the negative electrode can be manufactured by mixing the negative electrode active material, binder, and the conductive agent, forming the mixture into a pellet. The pellet can be used as the negative electrode layer.

3) Nonaqueous Electrolyte

Examples of the nonaqueous electrolyte include a liquid nonaqueous electrolyte and a gel-like nonaqueous electrolyte. The liquid nonaqueous electrolyte is prepared by dissolving an electrolyte in an organic solvent. The gel-like nonaqueous electrolyte is prepared by forming a composite of a liquid electrolyte and a polymer material.

The liquid nonaqueous electrolyte is dissolved in an organic solvent in a concentration of 0.5 mol/L to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), bistrifluoromethylsulfonylimide lithium [$LiN(CF_3SO_2)_2$], or mixtures of these compounds. The electrolyte is preferably one which is scarcely oxidized even at a high potential and $LiPF_6$ is most preferable.

Examples of the organic solvent include cyclic carbonates such as propylene carbonate (PC), ethylene carbonate (EC) and vinylene carbonate, chain carbonates such as diethyl carbonate (DEC), dimethyl carbonate (DMC) and methylethyl carbonate (MEC), cyclic ethers such as tetrahydrofuran (THF), 2-methyltetrahydrofuran (2MeTHF) and dioxolan (DOX), chain ethers such as dimethoxyethane (DME) and diethoethane (DEE), γ-butyrolactone (GBL), acetonitrile (AN) and sulfolan (SL). These organic solvents may be used either singly or in combinations of two or more.

Examples of the polymer material include a polyvinylidene fluoride (PVdF), polyacrylonitrile (PAN) and polyethylene oxide (PEO).

A cold molten salt (ionic melt) containing lithium ions, polymer solid electrolyte, inorganic solid electrolyte and the like may also be used as the nonaqueous electrolyte.

The cold molten salt (ionic melt) means compounds which may exist in a liquid state at normal temperature (15 to 25° C.) among organic salts constituted of combinations of organic cations and anions. The cold molten salts include those which singly exist in a liquid state, those which are put into a liquid state when mixed with an electrolyte and those which are put into a liquid state when dissolved in an organic solvent. Generally, the melting point of the cold molten salt used in a nonaqueous electrolyte battery is 25° C. or less. Further, the organic cation generally has a quaternary ammonium skeleton.

The polymer solid electrolyte is prepared by dissolving an electrolyte in a polymer material and by solidifying the electrolyte mixture.

The inorganic solid electrolyte is a solid material having lithium ion-conductivity.

4) Separator

The separator may be formed of a porous film comprising a polyethylene, polypropylene, cellulose or polyvinylidene fluoride (PVdF), or synthetic resin nonwoven fabric. Among these materials, a porous film formed of a polyethylene or polypropylene melts at a fixed temperature, making it possible to shut off current and is therefore preferable from the viewpoint of improving safety.

5) Container

A container made of a laminate film or a metal container may be used. The laminate film preferably has a thickness of 0.5 mm or less. The metal container preferably has a thickness of 1.0 mm or less. The thickness of the laminate film is more preferably 0.2 mm or less. The metal container has a thickness of, more preferably, 0.5 mm or less and most preferably 0.2 mm or less.

Examples of the shape of the container include a flat type (thin type), angular type, cylinder type, coin type and button type. The container having a size corresponding to the dimensions of a battery are used. For example, containers for small-sized batteries to be mounted on portable electronic devices and containers for large-sized batteries to be mounted on, for example, two- to four-wheel vehicles are used.

As the laminate film, a multilayer film prepared by interposing a metal layer between resin layers may be used. The metal layer is preferably formed of an aluminum foil or aluminum alloy foil to reduce the weight of the battery. For example, polymer materials such as polypropylene (PP), polyethylene (PE), nylon and polyethylene terephthalate (PET) may be used for the resin layer. The laminate film can be molded into a desired shape by sealing through thermal fusion.

The metal container is made of aluminum, an aluminum alloy or the like. The aluminum alloy is preferably an alloy containing one or more elements selected from magnesium, zinc, and silicon. When the alloy contains transition metals such as iron, copper, nickel and chromium, the amount of the transition metals is preferably 1 mass % or less. This significantly improves the long-term reliability under a high-temperature environment and heat dissipation performances.

6) Nonaqueous Electrolyte Battery

Next, the nonaqueous electrolyte battery according to the third embodiment will be explained in more detail with reference to the drawings. The same reference numeral is attached to a structure common to the embodiments and duplicated explanations are omitted here. Each drawing is a typical view for explaining the embodiment and for promoting the understanding of the embodiment. Though there are parts different from an actual battery in shape, dimension and ratio, these structural designs may be properly changed taking the following explanations and known technologies into consideration.

Figure 2:
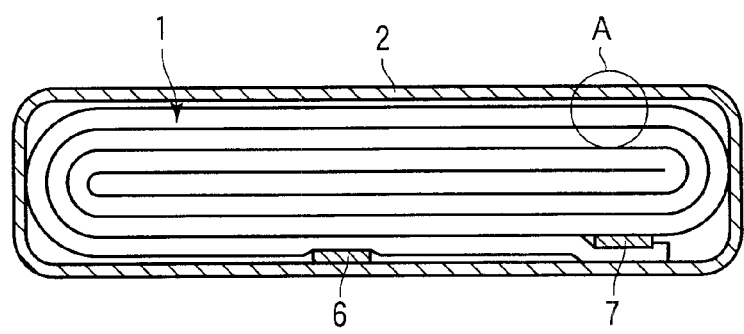
FIG. 2 is a sectional view of a flat type nonaqueous electrolyte battery according to a third embodiment.
Figure 3:
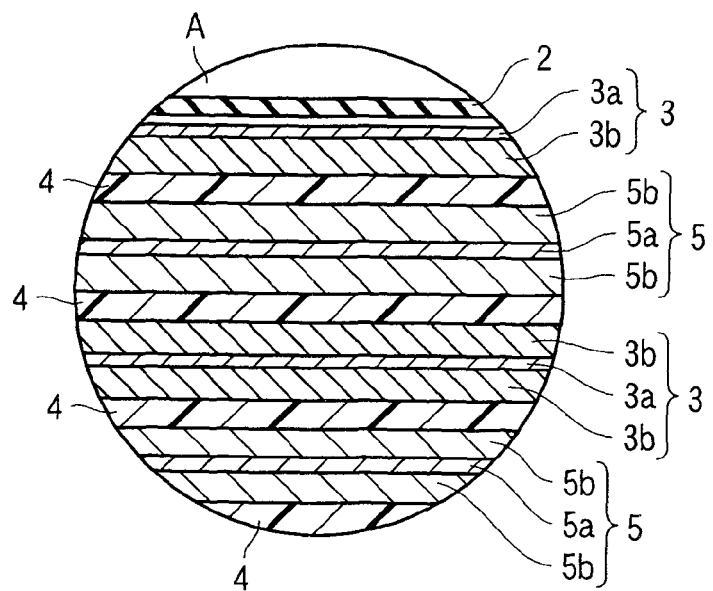
FIG. 3 is an enlarged sectional view of a part A in FIG. 2.

FIG. 2 is a sectional view of a flat type nonaqueous electrolyte secondary battery. FIG. 3 is an enlarged sectional view of the A-part of FIG. 2.

A flat type coil electrode group 1 is accommodated in a baggy container 2 made of a laminate film obtained by interposing an aluminum foil between two resin layers. The coil electrode groups 1 having a flat form are formed by spirally coiling a laminate obtained by laminating a negative electrode 3, a separator 4, a positive electrode 5 and a separator 4 in this order from the outside and by press-molding the coiled laminate. The outermost negative electrode 3 has a structure in which a negative electrode layer 3b is formed on one inside surface of a negative electrode current collector 3a as shown in FIG. 3. Other negative electrodes 3 each have a structure in which a negative electrode layer 3b is formed on each surface of the current collector 3a. An active material comprised in the negative electrode layer 3b contains the negative electrode active material as mentioned in the first embodiment.

In the positive electrode 5, a positive electrode layer 5b is formed on each surface of a positive electrode current collector 5a.

In the vicinity of the outer peripheral end of the coil electrode group 1, a negative electrode terminal 6 is connected to the negative electrode current collector 3a of the outermost negative electrode 3 and a positive electrode terminal 7 is connected to the positive electrode current collector 5a of the inside positive electrode 5. The negative electrode terminal 6 and positive electrode terminal 7 are externally extended from an opening part of the baggy container 2. A liquid nonaqueous electrolyte is injected from the opening part of the baggy container 2. The opening part of the baggy container 2 is closed by heat sealing with the negative electrode terminal 6 and positive electrode terminal 7 extended out of the opening part to thereby perfectly seal the coil electrode group 1 and liquid nonaqueous electrolyte.

The negative electrode terminal 6 is made of, for example, a material having electric stability and conductivity at the Li-absorption and release potential of the negative electrode active material. Specifically, examples of these materials include copper, nickel, stainless and aluminum. The negative electrode terminal is preferably made of the same material as the negative electrode current collector to reduce the contact resistance with the negative electrode current collector.

The positive electrode terminal 7 is made of, for example, a material having electric stability and conductivity in a potential range from, preferably, 3 V to 5 V relative to a lithium ion metal. Specific examples of these materials include aluminum alloys containing elements such as Mg, Ti, Zn, Mn, Fe, Cu and Si, and aluminum. The positive electrode terminal is preferably made of the same material as the positive electrode current collector to reduce the contact resistance with the positive electrode current collector.

Figure 4:
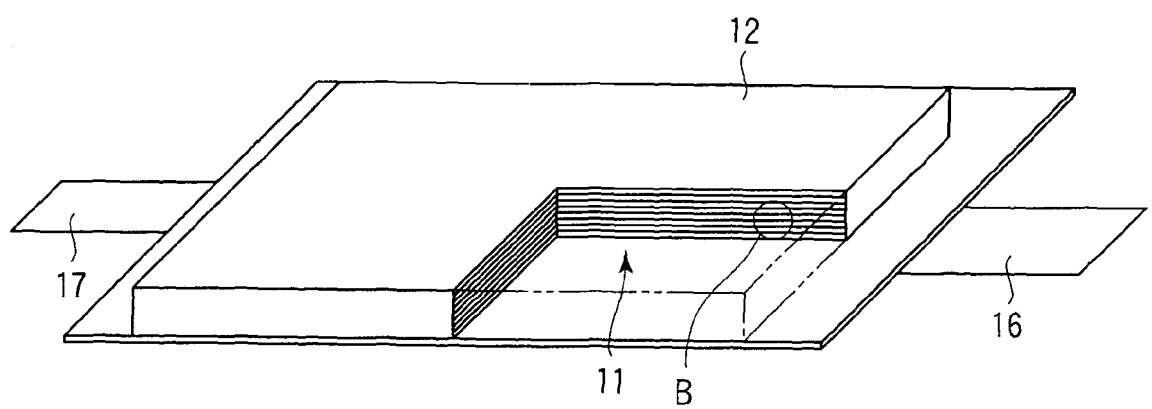
FIG. 4 is a partly broken perspective view of another flat type nonaqueous electrolyte battery according to a third embodiment.
Figure 5:
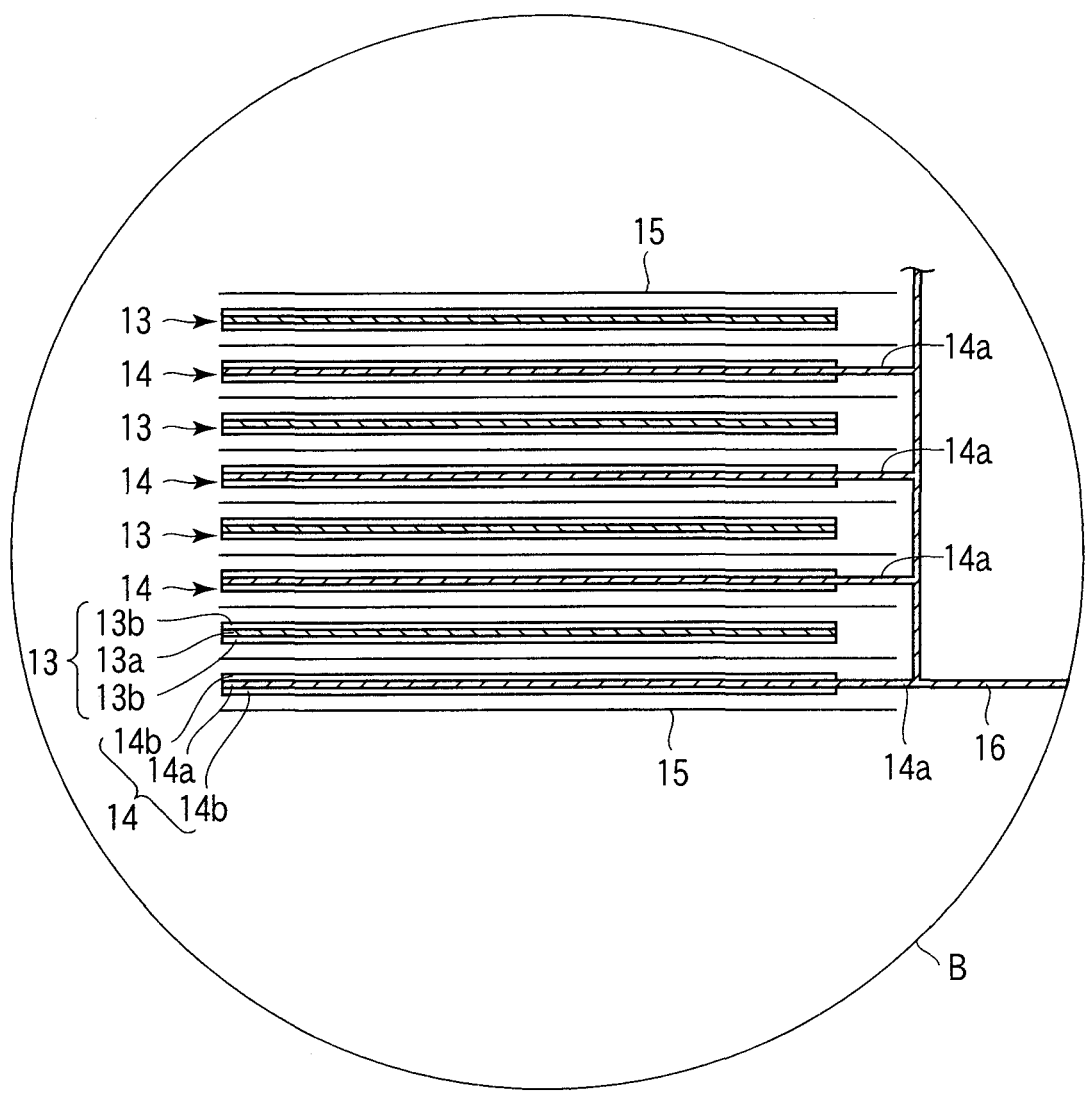
FIG. 5 is an enlarged sectional view of a part B in FIG. 4.

The nonaqueous electrolyte secondary battery according to the third embodiment is not limited to the structure shown in FIG. 2 and FIG. 3 and may have a structure as shown in, for example, FIG. 4 and FIG. 5. FIG. 4 is a partly broken perspective view typically showing another flat type nonaqueous secondary battery, and FIG. 5 is an enlarged sectional view of the B part of FIG. 4.

A laminate type electrode group 11 is accommodated in a container 12 made of a laminate film obtained by interposing a metal layer between two resin layer. The laminate type electrode group 11 has a structure in which a positive electrode 13 and a negative electrode 14 are, as shown in FIG. 5, alternately laminated with a separator 15 interposed therebetween. The positive electrodes 13 exist in plural, each being provided with a current collector 13a and a positive electrode active material-containing layer 13b carried on each side of the current collector 13a. The negative electrodes 14 exist in plural, each being provided with a current collector 14a and a negative electrode active material-containing layer 14b carried on each side of the current collector 14a. One side of the current collector 14a of each negative electrode 14 is projected from the positive electrode 13. The projected current collector 14a is electrically connected to a band-shaped negative electrode terminal 16. The end of the band-shaped negative electrode terminal 16 is externally drawn out of the package member 11. Further, of the current collector 13a of the positive electrode 13, the side positioned opposite to the projected side of the current collector 14a is projected from the negative electrode 14. The current collector 13a projected from the negative electrode 14 is electrically connected to a band-shaped positive electrode terminal 17. The end of the band-shaped positive electrode terminal 17 is positioned opposite to the negative electrode terminal 16 and drawn out of the side of the package member 11.

According to the third embodiment, the nonaqueous electrolyte battery is provided with the negative electrode comprising the negative electrode active material according to the first embodiment. Therefore, a nonaqueous electrolyte battery having a high effective capacity and excellent repeat charge/discharge performances can be provided.

(Fourth Embodiment)

Next, a battery pack according to a fourth embodiment will be explained with reference to the drawings. The battery pack comprises one or two or more of the nonaqueous electrolyte batteries (unit cells) according to the third embodiment. When the battery pack includes two or more unit cells, these unit cells are disposed in such a manner that they are electrically connected in series or in parallel.

Such a battery pack will be explained in detail with reference to FIG. 6 and FIG. 7. A flat type battery as shown in FIG. 2 may be used as the unit cell 21.

A plurality of unit cells 21 are laminated such that the externally extended negative electrode terminal 6 and positive electrode terminal 7 are arranged in the same direction and fastened with an adhesive tape 22 to thereby constitute a battery module 23. These unit cells 21 are electrically connected in series as shown in FIG. 7.

A printed wiring board 24 is disposed opposite to the side surface of the unit cell 21 from which the negative electrode terminal 6 and positive electrode terminal 7 are extended. As shown in FIG. 7, a thermistor 25, a protective circuit 26 and an energizing terminal 27 connected to external devices are mounted on the printed wiring board 24. An insulating plate (not shown) is attached to the surface of the protective circuit substrate 24 facing the battery module 23 to avoid unnecessary connection with the wiring of the battery module 23.

A positive electrode side lead 28 is connected to the positive electrode terminal 7 positioned on the lowermost layer of the battery module 23 and one end of the positive electrode side lead 28 is inserted into and electrically connected to a positive electrode side connector 29 of the printed wiring board 24. A negative electrode side lead 30 is connected to the negative electrode terminal 6 positioned on the uppermost layer of the battery module 23 and one end of the negative electrode side lead 30 is inserted into and electrically connected to a negative electrode side connector 31 of the printed wiring board 24. These connectors 29 and 31 are connected to the protective circuit 26 through wirings 32 and 33 formed on the printed wiring board 24.

The thermistor 25 is used to detects the temperature of the unit cell 21 and the detected signals are transmitted to the protective circuit 26. The protective circuit 26 can shut off a plus side wiring 34a and minus side wiring 34b between the protective circuit 26 and the energizing terminal 27 connected to external devices in a predetermined condition. The predetermined condition means, for example, the case where the temperature detected by the thermistor 25 is a predetermined one or higher. Also, the predetermined condition means, for example, the case of detecting overcharge, overdischarge and over-current of the unit cell 21. The detections of this overcharge and the like are made for individual unit cells 21 or whole unit cells 21. When individual unit cells 21 are detected, either the voltage of the battery may be detected or the potential of the positive electrode or negative electrode may be detected. In the latter case, a lithium electrode used as a reference electrode is inserted between individual unit cells 21. In the case of FIG. 6 and FIG. 7, a wiring 35 for detecting voltage is connected to each unit cell 21 and the detected signals are transmitted to the protective circuit 26 through these wirings 35.

A protective sheet 36 made of a rubber or resin is disposed on each of the three side surfaces of the battery module 23 excluding the side surface from which the positive electrode terminal 7 and negative electrode terminal 6 are projected.

The battery module 23 is accommodated in a receiving container 37 together with each protective sheet 36 and printed wiring board 24. Specifically, the protective sheet 36 is disposed on each inside surface in the direction of the long side and on one of the inside surfaces in the direction of the short side of the receiving container 37, and the printed wiring board 24 is disposed on the other inside surface in the direction of the short side. The battery module 23 is positioned in a space enclosed by the protective sheet 36 and the printed wiring board 24. A lid 38 is attached to the upper surface of the receiving container 37.

Here, a thermally contracting tape may be used in place of the adhesive tape 22 to secure the battery module 23. In this case, after the protective sheet is disposed on both sides of the battery module and the thermally contracting tubes are wound around the battery module; the thermally contracting tape is contracted by heating to fasten the battery module.

Figure 6:
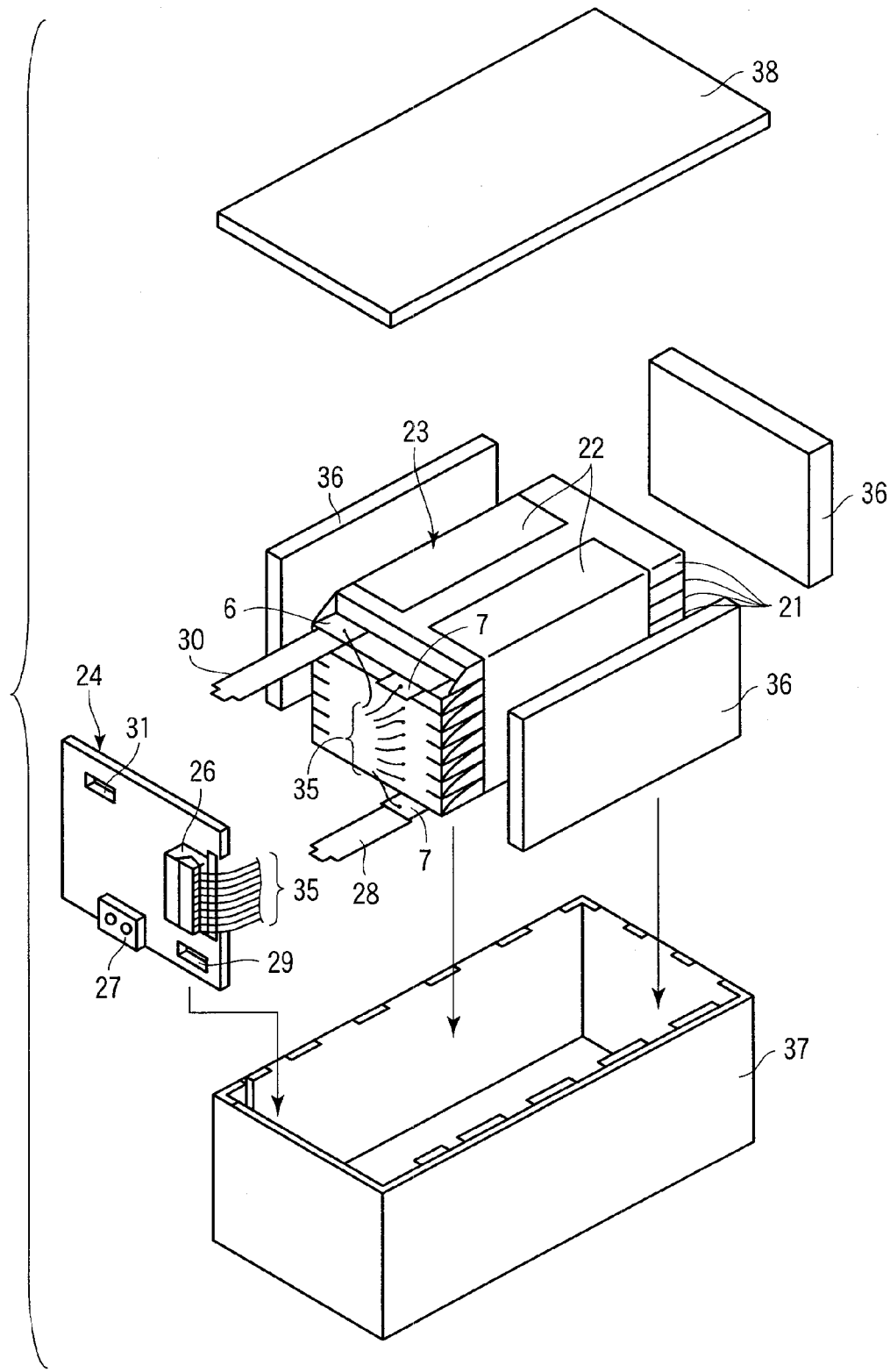
FIG. 6 is an exploded perspective view of a battery pack according to a fourth embodiment.

The structure in which the unit cells 21 are connected in series is shown in FIG. 6 and FIG. 7. However, these unit cells may be connected in parallel to increase the capacity of the battery. The assembled battery packs may be further connected in series or in parallel.

Also, the structure of the battery pack is appropriately changed according to its use. The battery pack is preferably used in applications exhibiting excellent cycle performances when a large current is extracted. Specific examples of these applications include power sources for digital cameras, and power sources mounted on vehicles such as two- to four-wheel vehicles hybrid electric cars, two- to four-wheel electric cars and assist bicycles. The battery pack is preferably used for power sources mounted on vehicles.

EXAMPLES

The embodiments will be explained in more detail by way of examples. However, the embodiments are not limited to these examples. The identification of the crystal phase and the estimation of the crystal structure as to the product obtained in the synthesis were made by the powder X-ray diffraction method using Cu-Kα radiation. The measurement of specific surface area of the products was made by the BET method. Further, the composition of the products was analyzed by the ICP method to confirm that a target product was obtained.

Synthetic Example 1

Synthesis of a Titanium Oxide Compound by Using $K_2Ti_4O_9$ as Starting Material A commercially available $K_2Ti_4O_9$ reagent was used as a starting material to synthesize a proton titanate compound $H_2Ti_4O_9$. First, a $K_2Ti_4O_9$ powder was washed with distilled water to remove impurities. Then, 5 g of the $K_2Ti_4O_9$ powder was poured into a zirconia pot having an internal volume of 100 cm$^3$, to which was then added zirconia balls 10 mm in diameter to fill about ⅓ of the volume of the pot. This pot was rotated at 800 rpm for 2 hours to grind $K_2Ti_4O_9$ into particles having an average particle diameter of about 5 μm.

Then, the ground $K_2Ti_4O_9$ powder was added in a 1 M hydrochloric acid solution and stirred at 25° C. for 72 hours. The 1 M hydrochloric acid was replaced every 24 hours. Potassium ions were thereby exchanged for protons to obtain a proton-exchanged compound $H_2Ti_4O_9$.

The obtained suspension had good dispersibility and could not be separated by filtration. Therefore, the proton-exchanged compound was isolated from a solvent by a centrifuge. A powder of the obtained proton-exchanged compound was washed with distilled water until the pH of the washing solution was 6 to 7.

Then, the proton-exchanged compound was heated for 3 hours. The temperature of the proton-exchanged compound was varied in increments of 25° C. in a temperature range from 300 to 400° C. to determine an appropriate heating condition. The heating temperature was set as follows: Synthetic Example 1-1: 300° C., Synthetic Example 1-2: 325° C., Synthetic Example 1-3: 350° C., Synthetic Example 1-4: 375° C. and Synthetic Example 1-5: 400° C. In order to obtain an exact heat history, the sample was placed in an electric furnace preheated to the set temperatures. After being heated, the sample was taken out of the furnace and quenched rapidly in air. The heated sample was dried at 80° C. in a vacuum for 12 hours to obtain titanium dioxide having a $TiO_2(B)$ structure.

Further, in order to change the specific surface area, Synthetic Example 1-3 was mechanically ground to make a sample as Synthetic Example 1-6. Synthetic Example 1-6 was titanium dioxide having a $TiO_2(B)$ structure and a higher specific surface area than Synthetic Example 1-3.

(Powder X-Ray Diffraction Measurement)

Each titanium dioxide obtained in Synthetic Examples 1-1 to 1-6 was measured by the powder X-ray diffraction method to obtain the plane spacing ($d_{001}$) and peak intensity ratio I(200)/I(001). The results are shown in Table 1. The value of $d_{001}$ of each titanium dioxide was 6.215 Å to 6.238 Å (error: within 0.001 Å). The peak intensity ratio I(200)/I(001) was 0 to 0.65.

(Production of an Electrochemical Measuring Cell)

The titanium dioxide synthesized above was used to manufacture an electrode. A polytetrafluoroethylene was mixed as a binder in each titanium dioxide powder obtained in Synthetic Examples 1-1 to 1-6 in an amount of 10% by mass based on the total mass of the electrode. The obtained mixture was molded to manufacture an electrode.

Ethylene carbonate and diethyl carbonate were mixed in a ratio by volume of 1:1 to prepare a mixed solvent. 1 M lithium perchlorate was added to the mixed solvent to prepare an electrolytic solution.

The above titanium dioxide electrode, a counter electrode and the electrolytic solution were used to manufacture a measuring cell. As the counter electrode, a metal lithium foil was used.

Since a lithium metal is used as the counter electrode in this measuring cell, the electrode potential of the titanium dioxide electrode is noble relative to the counter electrode. Thus, the titanium dioxide electrode was worked as the positive electrode. However, the titanium dioxide electrode may be used as a negative electrode if it is combined with a positive electrode active material. In the measuring cell, the directions of charge and discharge are opposite to those of a battery using titanium dioxide as the negative electrode active material. In order to avoid confusion here, the direction in which lithium ions are inserted into the titanium dioxide electrode is called a charge direction and the direction in which lithium ions are released from the titanium dioxide electrode is called a discharge direction.

(Evaluation of Charge/Discharge Capacity)

The charge/discharge capacity of each measuring cell of Synthetic Examples 1-1 to 1-5 was measured. In the measurement, the measuring cell was made to charge and discharge in the condition of a potential range from 1.0 V to 3.0 V based on a metal lithium electrode, a charge/discharge current of 0.05 mA/cm$^2$ and ambient temperature.

(Evaluation of Repeat Discharge Performances)

Using each of the measuring cells obtained in Synthetic Examples 1-1 to 1-5, a charge-discharge operation was repeated for 50 cycles (charge operation and discharge operation=one cycle) to examine the discharge capacity retention ratio. The measurement was made in the condition of a potential range from 1.0 V to 3.0 V based on metal lithium electrode, a charge/discharge current of 0.05 mA/cm$^2$ and ambient temperature.

The capacity retention ratio based on the first cycle discharge capacity was calculated. In the case, the first cycle discharge capacity when the charge/discharge current was 0.05 mA/cm$^2$ was considered 100%.

(Results)

The results are shown in Table 1. Each of Synthetic Examples 1-1 to 1-4 had $d_{001}$ of 6.22 Å or more and a peak intensity ratio I(200)/I(001) was 0.5 or less. Synthetic Example 1-5 had $d_{001}$ less than 6.22 Å and a peak intensity ratio I(200)/I(001) exceeded 0.5. This fact shows that in Synthetic Example 1, titanium dioxide having a TiO$_2$(B) structure and also having $d_{001}$ of 6.22 Å or more and a peak intensity ratio I(200)/I(001) of 0.5 or less is obtained when the heating temperature is 375° C. or less.

Synthetic Examples 1-1 to 1-4 and 1-6 respectively had a higher first cycle discharge capacity than Synthetic Example 1-5. This fact shows that titanium dioxide having a TiO$_2$(B) structure and also having $d_{001}$ of 6.22 Å or more and a peak intensity ratio I(200)/I(001) of 0.5 or less has a high discharge capacity.

Synthetic Examples 1-3 and 1-6 in which the heating temperature is 350° C. have a higher first cycle discharge capacity and capacity retention ratio than others, showing that the optimal heating temperature in Synthetic Example 1 is close to 350° C.

Synthetic Example 1-1 had a low capacity retention ratio. This is considered to be because the TiO$_2$(B) structure of Synthetic Example 1-1 has less crystallinity.

Figure 8:
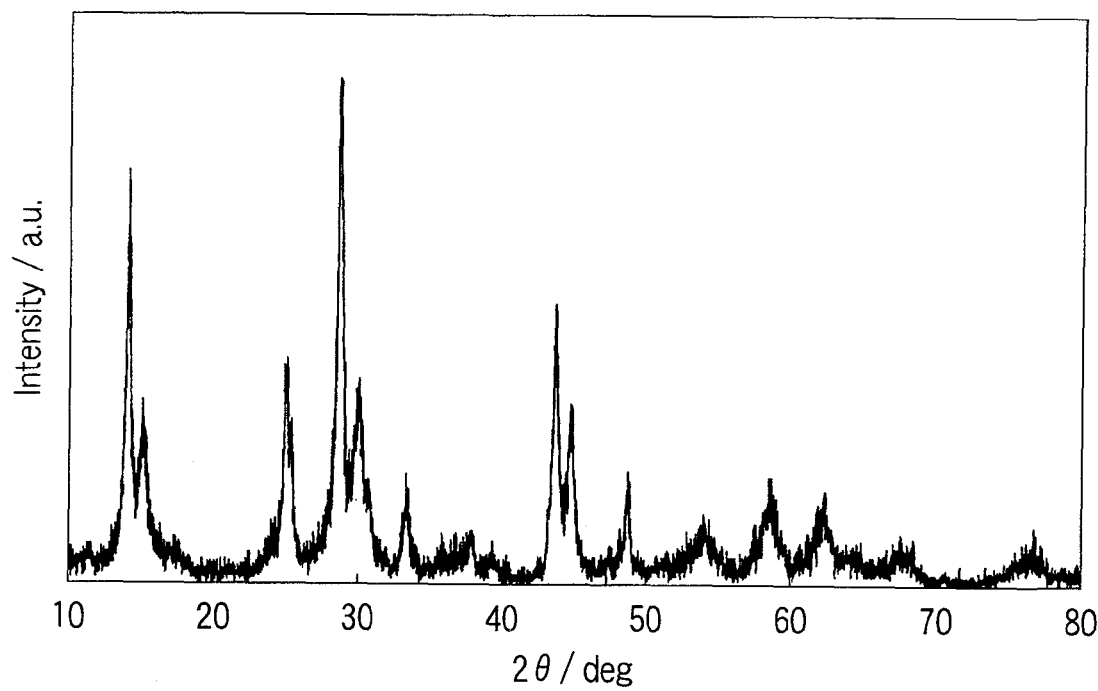
FIG. 8 is a powder XRD pattern of titanium dioxide of Example 1.

The above Synthetic Examples 1-3 and 1-6 were renamed as Example 1 and Example 2 respectively. A powder X-ray diffraction diagram using a Cu-Kα as the radiation source in this Example 1 is shown in FIG. 8. In the measurement of X-ray diffraction, the sample was ground until the average particle diameter was about 5 μm and then filled in the holder part of the glass sample plate in the same method as above. The sample was measured in the following conditions: scanning speed: 3 deg/min, step width: 0.2 deg, tube voltage: 40 kV and tube current: 20 mA. Further, the specific surface area of Example 1 was measured by the BET method. The results are shown in Table 3. Titanium dioxide of Example 1 had a specific surface area of 6.3 m$^2$/g. Further, the ground titanium dioxide of Example 2 had a specific surface area of 21.8 m$^2$/g. Although Example 1 substantially differed from Example 2 only in specific surface area, Example 1 had a higher initial capacity. This is considered to be because Example 1 had a lower specific surface area so that side reactions caused by the contact with the electrolytic solution is limited, resulting in a low resistance overvoltage. Hereinafter, Example 1 will be explained as a typical example.

TABLE 1

| Synthetic Example | Heating temperature (° C.) | $d_{001}$ (Å) | I(200)/I(001) | First cycle discharge capacity (mAh/g) | Discharge capacity retention ratio after 50 cycles (%) |
|---|---|---|---|---|---|
| 1-1 | 300 | 6.234 | 0 | 221 | 69 |
| 1-2 | 325 | 6.237 | 0.35 | 225 | 85 |
| 1-3 | 350 | 6.239 | 0.37 | 238 | 98 |
| 1-4 | 375 | 6.221 | 0.47 | 216 | 95 |
| 1-5 | 400 | 6.215 | 0.65 | 198 | 95 |
| 1-6 | 350 | 6.238 | 0.39 | 228 | 97 |

Synthetic Example 2

Synthesis of a Titanium Oxide Compound Using Na$_2$Ti$_3$O$_7$ as Starting Material A commercially available Na$_2$Ti$_3$O$_7$ reagent was used as a starting material to synthesize a proton titanate compound H$_2$Ti$_3$O$_7$. First, a powder of Na$_2$Ti$_3$O$_7$ was washed with distilled water to remove impurities. Next, 5 g of the Na$_2$Ti$_3$O$_7$ powder was poured into a zirconia pot having an internal volume of 100 cm$^3$, to which was then added zirconia balls 10 mm in diameter to fill about ⅓ of the volume of the pot. This pot was rotated at 800 rpm for 2 hours to grind Na$_2$Ti$_3$O$_7$.

The sintering temperature of sodium titanate is lower than that of potassium titanate. This enables sodium titanate to have a smaller average particle diameter. Therefore, the powder was ground until the average particle diameter was decreased to about 1 μm.

Then, the ground Na$_2$Ti$_3$O$_7$ powder was added in a 1 M hydrochloric acid solution and stirred at 25° C. for 48 hours.

The 1 M hydrochloric acid was replaced every 24 hours. Sodium ions were thereby exchanged for protons to obtain a proton-exchanged compound $H_2Ti_3O_7$.

The obtained suspension had good dispersibility and could not be separated by filtration. Therefore, the proton-exchanged compound was isolated from a solvent by using a centrifuge. A powder of the obtained proton-exchanged compound was washed with distilled water until the pH of the washing solution was 6 to 7.

Then, the proton-exchanged compound was heated for 3 hours. The temperature of the proton-exchanged compound was varied in increments of 25° C. in a temperature range from 300 to 400° C. to determine an appropriate heating condition. The heating temperature was set as follows: Synthetic Example 2-1: 300° C., Synthetic Example 2-2: 325° C., Synthetic Example 2-3: 350° C., Synthetic Example 2-4: 375° C. and Synthetic Example 2-5: 400° C. In order to obtain an exact heat history, the sample was placed in an electric furnace preheated to a set temperature. After being heated, the sample was taken out of the furnace and quenched rapidly in air. The heated sample was dried at 80° C. in a vacuum for 12 hours to obtain titanium dioxide having a $TiO_2(B)$ structure.

(Powder X-Ray Diffraction Measurement)

Each titanium dioxide obtained in Synthetic Examples 2-1 to 2-5 was measured by the powder X-ray diffraction method in the same manner as in Synthetic Example 1, to obtain the $d_{001}$ and peak intensity ratio I(200)/I(001). The results are shown in Table 2. The $d_{001}$ of each titanium dioxide obtained in Examples 2-1 to 2-5 was 6.175 Å to 6.231 Å (error: within 0.001 Å). The peak intensity ratio I(200)/I(001) was 0 to 0.83.

(Production of an Electrochemical Measuring Cell)

The titanium dioxide produced above was used to manufacture an electrochemical measuring cell in the same manner as in Synthetic Example 1.

(Evaluation of Charge/Discharge Capacity)

The charge/discharge capacity of each measuring cell of Synthetic Examples 2-1 to 2-5 was measured in the same manner as in Synthetic Example 1.

(Evaluation of Repeat Discharge Performances)

The discharge capacity retention ratio of each of the measuring cells of Synthetic Examples 2-1 to 2-5 was examined in the same manner as in Synthetic Example 1.

(Results)

The results are shown in Table 2. Each of Synthetic Examples 2-1 to 2-3 had $d_{001}$ of 6.22 Å or more and a peak intensity ratio I(200)/I(001) was 0.5 or less. Synthetic Examples 2-4 and 2-5 respectively had $d_{001}$ less than 6.22 Å and also, a peak intensity ratio I(200)/I(001) exceeded 0.5. It is shown from this fact that in Synthetic Example 2, titanium dioxide having a $TiO_2(B)$ structure and also having $d_{001}$ of 6.22 Å or more and a peak intensity ratio I(200)/I(001) of 0.5 or less is obtained when the heating temperature is 350° C. or less.

Synthetic Examples 2-1 to 2-3 respectively had a higher first cycle discharge capacity than Synthetic Examples 2-4 and 2-5. It is shown from this fact that titanium dioxide having a $TiO_2(B)$ structure and also having $d_{001}$ of 6.22 Å or more and a peak intensity ratio I(200)/I(001) of 0.5 or less has a high discharge capacity.

Synthetic Example 2-3 in which the heating temperature is 350° C. has the highest first cycle discharge capacity and capacity retention ratio, showing that the optimal heating temperature in Synthetic Example 2 is close to 350° C.

Synthetic Example 2-1 had a low capacity retention ratio. This is considered to be because the $TiO_2(B)$ structure of Synthetic Example 2-1 has less crystallinity.

Figure 9:
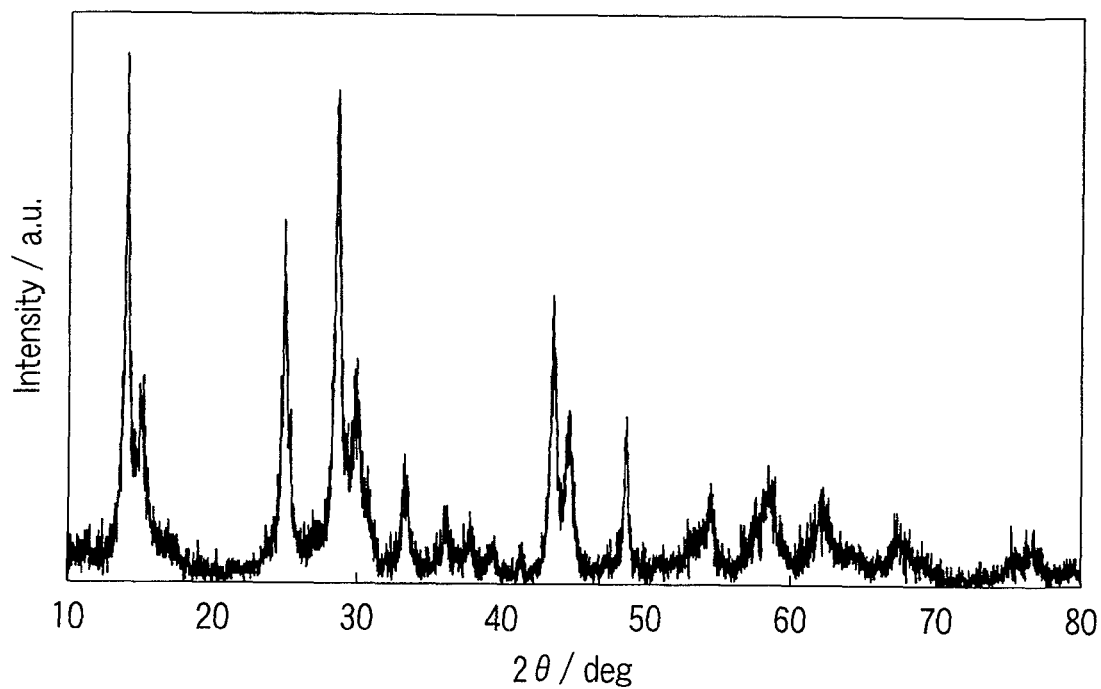
FIG. 9 is a powder XRD pattern of titanium dioxide of Example 2.

The above Synthetic Examples 2-3 was renamed as Example 3. A powder X-ray diffraction diagram using a Cu-Kα as the radiation source in this Example 2 is shown in FIG. 9. The measurement of X-ray diffraction was made in the same manner as in Example 1. Further, the specific surface area of Example 2 was measured by the BET method. The results are shown in Table 3. The titanium dioxide of Example 3 had a specific surface area of 37.5 m²/g.

TABLE 2

| Synthetic Example | Heating temperature (° C.) | $d_{001}$ (Å) | I(200)/I(001) | First cycle discharge capacity (mAh/g) | Discharge capacity retention ratio after 50 cycles (%) |
|---|---|---|---|---|---|
| 2-1 | 300 | 6.231 | 0 | 198 | 63 |
| 2-2 | 325 | 6.225 | 0.39 | 205 | 79 |
| 2-3 | 350 | 6.223 | 0.43 | 226 | 85 |
| 2-4 | 375 | 6.193 | 0.55 | 178 | 87 |
| 2-5 | 400 | 6.175 | 0.83 | 171 | 84 |

Comparative Example 1

Synthesis of $TiO_2(B)$

As Comparative Example 1, $TiO_2(B)$ was synthesized according to the synthetic method described in JP-A 2008-34368 (KOKAI). Potassium nitrate and titanium dioxide having an anatase structure were mixed in a predetermined ratio and the mixture was heated at 1000° C. for 24 hours to obtain a compound $K_2Ti_4O_9$. Next, this compound was poured into an aqueous 1 M nitric acid solution and stirred at ambient temperature for 12 hours. The obtained powder was washed several times with distilled water and heated at 400° C. for 3 hours to obtain $TiO_2(B)$.

(Powder X-Ray Diffraction Measurement)

$TiO_2(B)$ of Comparative Example 1 was measured by the powder X-ray diffraction method in the same manner as in Synthetic Example 1 to obtain the $d_{001}$ and peak intensity ratio I(200)/I(001). The results are shown in Table 3. The $d_{001}$ was 6.212 Å (error: within 0.001 Å). The peak intensity ratio I(200)/I(001) was 0.67.

(Measurement of Specific Surface Area)

The specific surface area was measured by the BET method. $TiO_2(B)$ of Comparative Example 1 had a specific surface area of 8.3 m²/g.

(Production of an Electrochemical Measuring Cell)

An electrochemical measuring cell was manufactured using $TiO_2(B)$ generated above.

The cell was manufactured in the same manner as in Synthetic Example 1 except that acetylene black was used as a conductive adjuvant in an amount of 30% by mass based on the total mass of the electrode.

(Evaluation of Charge/Discharge Capacity)

The charge/discharge capacity of the measuring cell of Comparative Example 1 was measured in the same manner as in Synthetic Example 1.

(Evaluation of Repeat Discharge Performances)

The discharge capacity retention ratio of the measuring cell of Comparative Example 1 was examined in the same manner as in Synthetic Example 1.

(Results)

The results are shown in Table 3.

Comparative Example 2

Synthesis of $TiO_2(B)$

As Comparative Example 2, $TiO_2(B)$ was synthesized according to the synthetic method described in JP-A 2008-117625 (KOKAI). A sodium carbonate powder and titanium dioxide powder which were high-purity reagent were weighed and mixed such that the ratio by mol of Na:Ti=2:3. The resulting mixture was heated at 800° C. for 20 hours and this heating operation was repeated twice. The resulting $Na_2Ti_3O_7$ polycrystals were dipped in a 0.5 M hydrochloric acid solution, which was then kept at ambient temperature for 5 days to carry out proton exchange treatment. Thereafter, the resulting product was washed with water and dried at 120° C. under vacuum for 24 hours to obtain a proton-exchanged compound of $H_2Ti_3O_7$ polycrystals.

Next, the obtained $H_2Ti_3O_7$ polycrystals were heated at 320° C. in air for 20 hours to obtain $TiO_2(B)$.

(Powder X-Ray Diffraction Measurement)

$TiO_2(B)$ of Comparative Example 2 was measured by the powder X-ray diffraction method in the same manner as in Synthetic Example 1 to obtain the $d_{001}$ and peak intensity ratio I(200)/I(001). The results are shown in Table 3. The $d_{001}$ was 6.217 Å (error: within 0.001 Å). The peak intensity ratio I(200)/I(001) was 0.65.

(Measurement of Specific Surface Area)

The specific surface area was measured by the BET method. $TiO_2(B)$ of Comparative Example 2 had a specific surface area of 160.5 m$^2$/g.

(Production of an Electrochemical Measuring Cell)

An electrochemical measuring cell was manufactured using $TiO_2(B)$ generated above in the same manner as in Synthetic Example 1.

(Evaluation of Charge/Discharge Capacity)

The charge/discharge capacity of the measuring cell of Comparative Example 2 was measured in the same manner as in Synthetic Example 1.

(Evaluation of Repeat Discharge Performances)

The discharge capacity retention ratio of the measuring cell of Comparative Example 2 was examined in the same manner as in Synthetic Example 1.

(Results)

The results are shown in Table 3.

<Evaluation>

Figure 10:
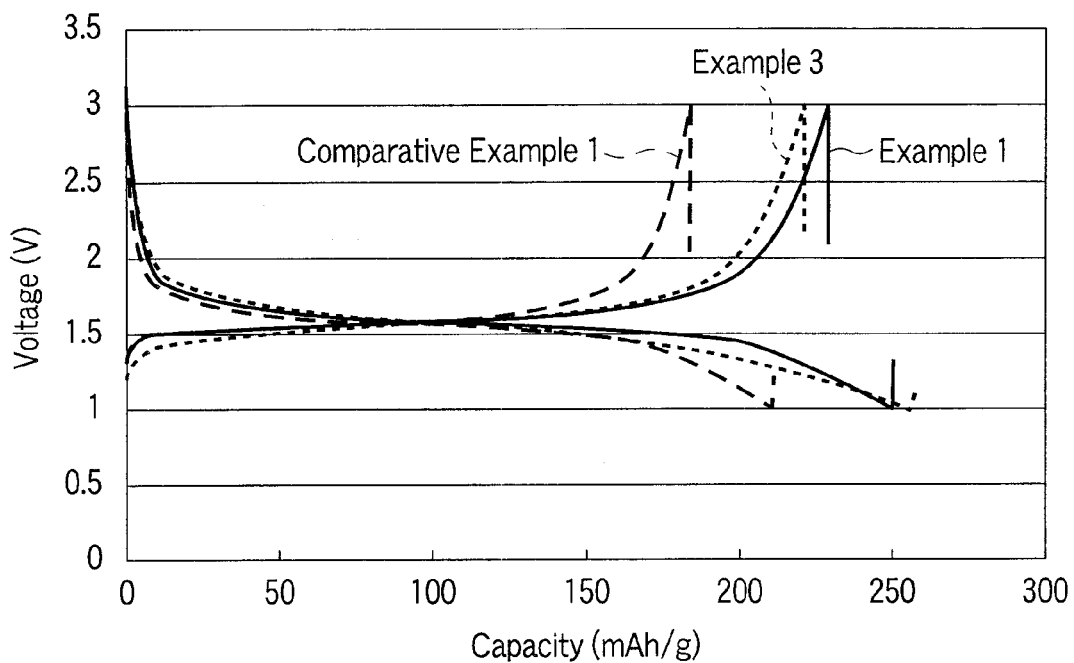
FIG. 10 is a diagram showing charge/discharge curves in Examples 1 and 2 and Comparative Example 1.

FIG. 10 shows charge/discharge curves of Examples 1 and 3 and Comparative Examples 1. As is understood from FIG. 10 and Table 3, it is shown that each first cycle discharge capacity of Examples 1 and 3 was higher by 15% to 40% than that of each of Comparative Examples 1 and 2 obtained by the conventionally known method.

Comparative Examples 1 and 2 each had a lower capacity retention ratio than each of Examples 1 to 3. This suggests that many lithium ions are trapped by a crystal in $TiO_2(B)$ obtained in each of Comparative Examples 1 and 2. It is considered that the crystal structures of Comparative Examples 1 and 2 are not most suitable. This is also evidenced by the fact that the $d_{001}$ of each of Comparative Examples 1 and 2 is less than 6.22 Å and the peak intensity ratio I(200)/I(001) exceeds 0.5. Further, the fact that $TiO_2(B)$ obtained in each of Comparative Examples 1 and 2 has a peak intensity ratio I(200)/I(001) exceeding 0.5 suggests that the crystallinity becomes too high due to excess heating and also, a trace amount of impurity phase is generated.

The above fact showed that the titanium oxide compound according to the embodiments has a higher discharge capacity and provides more excellent repeat charge/discharge performances than the titanium dioxide synthesized according to the conventionally known method, and therefore, enables stable charge/discharge operations.

<Relation Between the $d_{001}$ and Discharge Capacity>

Figure 11:
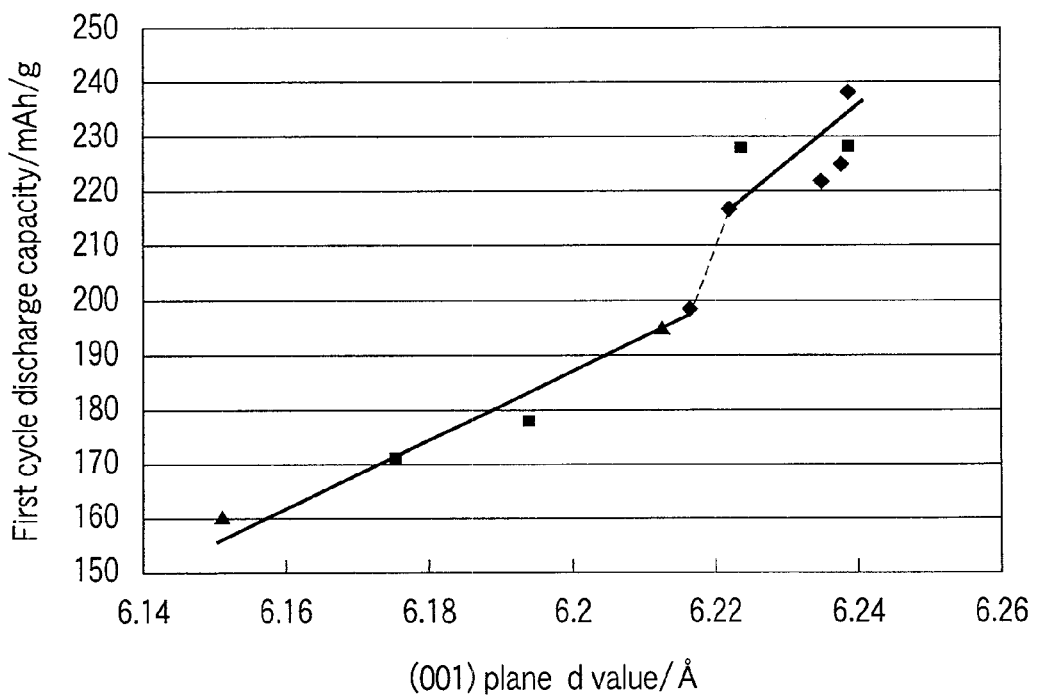
FIG. 11 is a graph showing the relation between the $d_{001}$ of $TiO_2(B)$ and first cycle discharge capacity.

FIG. 11 shows the relation between the first cycle discharge capacity and the $d_{001}$ value of $TiO_2(B)$ synthesized in each of Synthetic Examples 1 and 2 and Comparative Examples 1 and 2. As is clear from this FIG. 11, it is found that a first cycle discharge capacity as high as 200 mAh/g or more is shown in a $d_{001}$ range of 6.22 Å or more.

Therefore, it is shown that the titanium oxide compound which is synthesized by the method according to the embodiment and has a $d_{001}$ value of 6.22 Å or more has a larger discharge capacity than the titanium dioxide synthesized by a conventional synthetic method.

Although the heating time in the above Synthetic Examples was 3 hours, the heating time is not limited to this and may be properly changed. In the case where, for example, the heating time is longer than 3 hours, the heating temperature is dropped, thereby making it possible to control the crystal state of $TiO_2(B)$. This ensures that the heating condition to obtain $TiO_2(B)$ having $d_{001}$ of 6.22 Å or more and a peak intensity ratio I(200)/I(001) of 0.5 or less can be optionally searched.

While certain embodiments have been described, these embodiments have been presented by way of example only, and are not intended to limit the scope of the inventions.

TABLE 3

| | $d_{001}$ (Å) | I(200)/I(001) | First cycle discharge capacity (mAh/g) | Discharge capacity retention ratio after 50 cycles (%) | Specific surface area (m$^2$/g) |
|---|---|---|---|---|---|
| Example 1 | 6.239 | 0.37 | 238 | 98 | 6.3 |
| Example 2 | 6.238 | 0.39 | 228 | 97 | 21.8 |
| Example 3 | 6.223 | 0.43 | 226 | 85 | 37.5 |
| Comparative Example 1 | 6.212 | 0.67 | 195 | 80 | 8.3 |
| Comparative Example 2 | 6.217 | 0.65 | 162 | 78 | 160.5 |

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A titanium oxide compound having a crystal structure of a monoclinic titanium dioxide and satisfying the following equation (I):

$$d_{001} \geq 6.223 \text{ Å} \quad (I)$$

wherein $d_{001}$ is the spacing of the (001) plane which is measured by the powder X-ray diffraction method using a Cu—Kα radiation source, and wherein the titanium oxide compound has a crystal structure which belongs to the space group C2/m, the titanium oxide compound is suitable as an active material in a negative electrode of a nonaqueous electrolyte battery, the titanium oxide compound has a particle form the titanium oxide compound has a BET specific surface area in the range of 6 to 200 $m^2/g$; and the titanium compound satisfies the following equation (II):

$$0.39 \leq I(200)/I(001) \leq 0.5 \quad (II)$$

wherein I(001) is the peak intensity of the (001) plane and I(200) is the peak intensity of the (200) plane, which are measured by the powder X-ray diffraction method using a Cu—Kα radiation source.

2. A nonaqueous electrolyte battery comprising:
a positive electrode;
a negative electrode comprising the titanium oxide compound according to claim 1 as negative electrode active material; and
a nonaqueous electrolyte.

3. A battery pack comprising the nonaqueous electrolyte battery according to claim 2.

4. The battery pack according to claim 3, comprising a plurality of nonaqueous electrolyte batteries, wherein the nonaqueous electrolyte batteries are electrically connected in series and/or in parallel.

5. The nonaqueous battery according to claim 2, wherein the positive electrode comprises a positive electrode active material and the positive electrode active material comprises at least one selected from the group consisting of manganese dioxide, iron oxide, copper oxide, and nickel oxide impregnated with lithium, lithium-manganese composite oxide, lithium-nickel composite oxide, lithium-cobalt composite oxide, lithium-nickel-cobalt composite oxide, lithium-manganese-cobalt composite oxide, lithium-manganese-nickel composite oxide having a spinel structure, lithium-phosphorous oxide having an olivine structure, iron sulfate, vanadium oxide and lithium-nickel-cobalt-manganese composite oxide.

6. The nonaqueous battery according to claim 5, wherein the positive electrode active material has a specific surface area in the range of 0.1 to 10 $m^2/g$.

7. The nonaqueous battery according to claim 2, further comprising a positive electrode current collector made of an aluminum foil or an aluminum alloy foil.

8. The nonaqueous battery according to claim 2, wherein the negative electrode further comprises at least one selected from the group consisting of:
titanium dioxide having an anatase structure, lithium titanate having a rhamsdelite structure and lithium titanate having a spinel structure.

9. The nonaqueous battery according to claim 2, further comprising a negative electrode current collector made of copper, nickel, stainless or aluminum.

10. The active material according to claim 1, wherein $d_{001}$ is 6.50 Å or less.

11. The titanium oxide compound according to claim 1, wherein the crystal structure of the titanium oxide compound has a tunnel structure.

12. The titanium oxide compound according to claim 1, wherein d001 is 6.239 Å or less.

13. The titanium oxide compound according to claim 1, wherein I(200)/I(001) is in the range of 0.39 to 0.43.

* * * * *